US012798571B2

(12) United States Patent
Seo

(10) Patent No.: US 12,798,571 B2
(45) Date of Patent: Nov. 17, 2026

(54) APPARATUS AND METHOD FOR LANE-KEEPING CONTROL FOR A VEHICLE

(71) Applicant: HYUNDAI AUTOEVER CORP., Seoul (KR)

(72) Inventor: MyungHwan Seo, Seoul (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 36 days.

(21) Appl. No.: 18/951,059

(22) Filed: Nov. 18, 2024

(65) Prior Publication Data

US 2025/0162579 A1 May 22, 2025

(30) Foreign Application Priority Data

Nov. 21, 2023 (KR) ........................ 10-2023-0162284

(51) Int. Cl.
*B60W 30/12* (2020.01)
*G06V 20/56* (2022.01)

(52) U.S. Cl.
CPC ........... *B60W 30/12* (2013.01); *G06V 20/588* (2022.01); *B60W 2420/403* (2013.01); *B60W 2552/10* (2020.02); *B60W 2552/53* (2020.02); *B60W 2556/40* (2020.02); *B60W 2556/50* (2020.02)

(58) Field of Classification Search
CPC ........... B60W 30/12; B60W 2420/403; B60W 2552/10; B60W 2552/53; B60W 2556/40; B60W 2556/50; B60W 40/06; G06V 20/588; B60Y 2300/12
USPC ........................................................... 701/41
See application file for complete search history.

(56) References Cited

U.S. PATENT DOCUMENTS

2021/0025713 A1* 1/2021 Ma ..................... G01C 21/1656

FOREIGN PATENT DOCUMENTS

KR 101658089 B1 9/2016

* cited by examiner

*Primary Examiner* — Lindsay M Low
*Assistant Examiner* — Omar Morales
(74) *Attorney, Agent, or Firm* — Lempia Summerfield Katz LLC

(57) ABSTRACT

Provided are an apparatus and a method for lane-keeping control for a vehicle. The apparatus for lane-keeping control for a vehicle includes: a GPS receiver configured to receive GPS information from a GPS satellite; a communication module configured to receive real-time kinematic positioning (RTK) information from an RTK system; and a processor configured to: correct a location of a vehicle by using the GPS information and the RTK information to calculate precise positioning location information; obtain lane link information corresponding to the precise positioning location information; and determine a driving lane of the vehicle based on the precise positioning location information and the lane link information.

13 Claims, 6 Drawing Sheets

APPARATUS AND METHOD FOR LANE-KEEPING CONTROL FOR A VEHICLE

CROSS-REFERENCE TO RELATED APPLICATION

This application claims priority to and the benefit of Korean Patent Application No. 10-2023-0162284, filed on Nov. 21, 2023, the entire contents of which are incorporated herein by reference.

FIELD

The present disclosure relates to an apparatus and a method for lane-keeping control for a vehicle.

BACKGROUND

The statements in this section merely provide background information related to the present disclosure and may not constitute prior art.

With the advancements in various technologies, systems designed to make vehicle driving safer and more convenient have been developed and applied to actual vehicles to enhance driver safety. In particular, among such systems, the development of lane-keeping devices, which may prevent an accident caused by lane departure due to long driving hours, drowsy driving, or driver's failure to pay attention to the road ahead, has been actively progressing.

Lane-keeping devices identify and control lines by using image information captured by a front-facing camera to keep a vehicle in its driving lane in case of lane departure caused by the driver's inattention.

However, with conventional lane-keeping devices using image information, the lines are hardly visible in adverse weather conditions such as rain or snow, thereby making it difficult to accurately identify the lines. As a result, it is impossible to determine whether the vehicle has departed from the lane, which may potentially put the vehicle in a dangerous situation.

SUMMARY

An objective of the present disclosure is to provide an apparatus and a method for lane-keeping control for a vehicle, which may identify lines even in a situation where the lines are not visible due to adverse weather conditions, thereby preventing lane departure of a vehicle and keeping a driving lane.

According to some embodiments of the present disclosure, an apparatus for lane-keeping control for a vehicle includes: a GPS receiver configured to receive GPS information from a GPS satellite; a communication module configured to receive real-time kinematic positioning (RTK) information from an RTK system; and a processor configured to correct a location of a vehicle by using the GPS information and the RTK information to calculate precise positioning location information. The processor is further configured to: obtain lane link information corresponding to the precise positioning location information; and determine a driving lane of the vehicle based on the precise positioning location information and the lane link information.

In some embodiments of the present disclosure, the processor is configured to: obtain lane link information corresponding to the precise positioning location from a map information DB; calculate lines marked on both sides of a lane based on a central location of the lane included in the lane link information; and determine the lane as a driving lane when the precise positioning location information is present within a range of the lines marked on both sides.

In some embodiments of the present disclosure, when the precise positioning location information is present in two lanes, the processor is configured to: calculate orthogonal distances between the precise positioning location information and each of the two lanes; and determine the driving lane of the vehicle based on the two orthogonal distances.

In some embodiments of the present disclosure, the processor is configured to: when the RTK status flag is in Fix status, determine a RTK status flag based on the RTK information; determine a lane corresponding to the smaller value between the two orthogonal distances as the driving lane of the vehicle. When the RTK status flag is in Float status, the processor is configured to: apply a weight to a orthogonal distance, among the two orthogonal distances, that is associated with a lane other than a previous driving lane, and determine a lane corresponding to a smaller value between the weighted orthogonal distance and an unweighted orthogonal distance as the driving lane of the vehicle.

In some embodiments of the present disclosure, the processor is configured to monitor lane departure of the vehicle based on the driving lane.

In some embodiments of the present disclosure, the apparatus for lane-keeping control for a vehicle further includes a capture module configured to capture an image of the front of the vehicle. The processor is configured to: analyze the captured front image to identify line information; determine a driving lane of the vehicle based on the identified line information; and monitor lane departure of the vehicle based on the driving lane.

According some embodiments of the present disclosure, a method for lane-keeping control for a vehicle includes: analyzing, by a processor, front image information to detect lines; determining, by the processor, whether it is possible to determine a driving lane of the vehicle by using the detected lines; when it is not possible to determine the driving lane, determining, by the processor, the driving lane of the vehicle based on precise positioning location information of the vehicle and map information; and monitoring lane departure, by the processor, by using the driving lane.

In some embodiments of the present disclosure, determining the driving lane of the vehicle includes: correcting, by the processor, a location of the vehicle by using GPS information and RTK information of the vehicle to calculate the precise positioning location information; obtaining, by the processor, lane link information corresponding to the precise positioning location information; and determining, by the processor, the driving lane of the vehicle based on the precise positioning location information and the lane link information.

In some embodiments of the present disclosure, obtaining the lane link information includes: obtaining lane link information corresponding to the precise positioning location from a map information DB.

In some embodiments of the present disclosure, determining the driving lane of the vehicle based on the precise positioning location information and the lane link information includes: calculating lines marked on both sides of a lane based on a central location of the lane included in the lane link information; and determining the lane as the driving lane when the precise positioning location information is present within a range of the lines marked on both sides of the lane.

In some embodiments of the present disclosure, determining the driving lane of the vehicle based on the precise positioning location information and the lane link information includes: when the precise positioning location information is present in two lanes, calculating orthogonal distances between the precise positioning location information and each of the two lanes; and determining the driving lane of the vehicle based on the two orthogonal distances.

In some embodiments of the present disclosure, determining the driving lane of the vehicle based on the precise positioning location information and the lane link information includes: determining a RTK status flag based on the RTK information; when the RTK status flag is in Fix status, determining a lane corresponding to a smaller value between the two orthogonal distances as a driving lane of the vehicle; and when the RTK status flag is in Float status, applying a weight to a orthogonal distance, among the two orthogonal distances, that is associated with a lane other than a previous driving lane, and determining a lane corresponding to a smaller value between the weighted orthogonal distance and an unweighted orthogonal distance as the driving lane of the vehicle.

In some embodiments of the present disclosure, the method for lane-keeping control for a vehicle further includes, after determining whether it is possible to determine a driving lane of the vehicle, monitoring lane departure of the vehicle, by the processor, by using the detected lines when it is possible to determine the driving lane.

According some embodiments of the present disclosure, a method for lane-keeping control for a vehicle includes: correcting, by a processor, a location of a vehicle by using GPS information and RTK information of the vehicle to calculate precise positioning location information; obtaining, by the processor, lane link information corresponding to the precise positioning location from a map information DB; determining, by the processor, a driving lane of the vehicle based on the precise positioning location information and the lane link information; and monitoring lane departure, by the processor, by using the driving lane.

In some embodiments of the present disclosure, determining the driving lane of the vehicle includes: calculating lines marked on both sides of a lane based on a central location of the lane included in the lane link information; and determining the lane as the driving lane when the precise positioning location information is present within a range of the lines marked on both sides of the lane.

In some embodiments of the present disclosure, determining the driving lane of the vehicle includes: when the precise positioning location information is present in two lanes, calculating orthogonal distances between the precise positioning location information and each of the two lanes; and determining the driving lane of the vehicle based on the two orthogonal distances.

In some embodiments of the present disclosure, determining the driving lane of the vehicle includes: determining a RTK status flag based on the RTK information; determining a lane corresponding to a smaller value between the two orthogonal distances as a driving lane of the vehicle when the RTK status flag is in Fix status; and when the RTK status flag is in Float status, applying a weight to the orthogonal distance, among the two orthogonal distances, that is associated with a lane other than a previous driving lane, and determining a lane corresponding to a smaller value between the weighted orthogonal distance and an unweighted orthogonal distance as a driving lane of the vehicle.

The apparatus and the method for lane-keeping control for a vehicle according to the present disclosure may identify a driving lane by using precise positioning information and map information to identify lines even in a situation where the lines are not visible due to adverse weather conditions, thereby preventing lane departure and keeping the driving lane.

DETAILED DESCRIPTION

Figure 1:
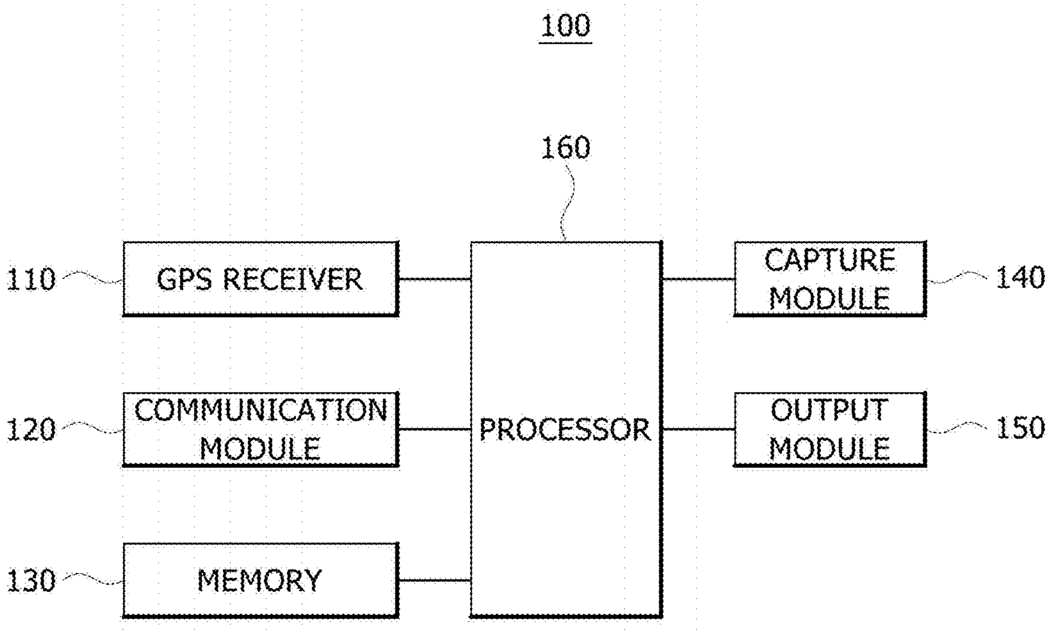
FIG. 1 is a block diagram showing an apparatus for lane-keeping control for a vehicle according to an embodiment of the present disclosure.

Hereinafter, an apparatus and a method for lane-keeping control for a vehicle are described below with reference to the accompanying drawings through various embodiments. It should be considered that the thickness of each line or the size of each component in the drawings may be exaggeratedly illustrated for clarity and convenience of description. In addition, the terms as used herein are defined in consideration of functions of the present disclosure, and these terms may change depending on a user or operator's intention or practice. Therefore, these terms should be defined based on the entirety of the disclosure set forth herein.

The term "vehicle" as used herein refers to a vehicle driving on a road and may include, for example, an internal combustion engine vehicle, a hybrid electric vehicle (HEV), an electric vehicle (EV), an autonomous vehicle, an intelligent vehicle with an Advanced Driver Assistance System (ADAS), and the like. The term "road" refers to a way for vehicles to travel on, and may include various types of roads, for example, highways, national highways, local roads, expressways, automobile-only roads, and the like. A road may include one or multiple lanes. The term "lane" may correspond to a road space distinguished from one another by lines marked on a road surface. A lane may be distinguished by lines on the left and right adjacent to the lane. In addition, "lanes" may be understood as lines of various shapes, including solid, dotted, curved, and zigzag lines, marked in white, blue, or yellow on the road surface.

When a component, device, element, or the like of the present disclosure is described as having a purpose or performing an operation, function, or the like, the component, device, or element should be considered herein as being "configured to" meet that purpose or to perform that operation or function.

Figure 2:
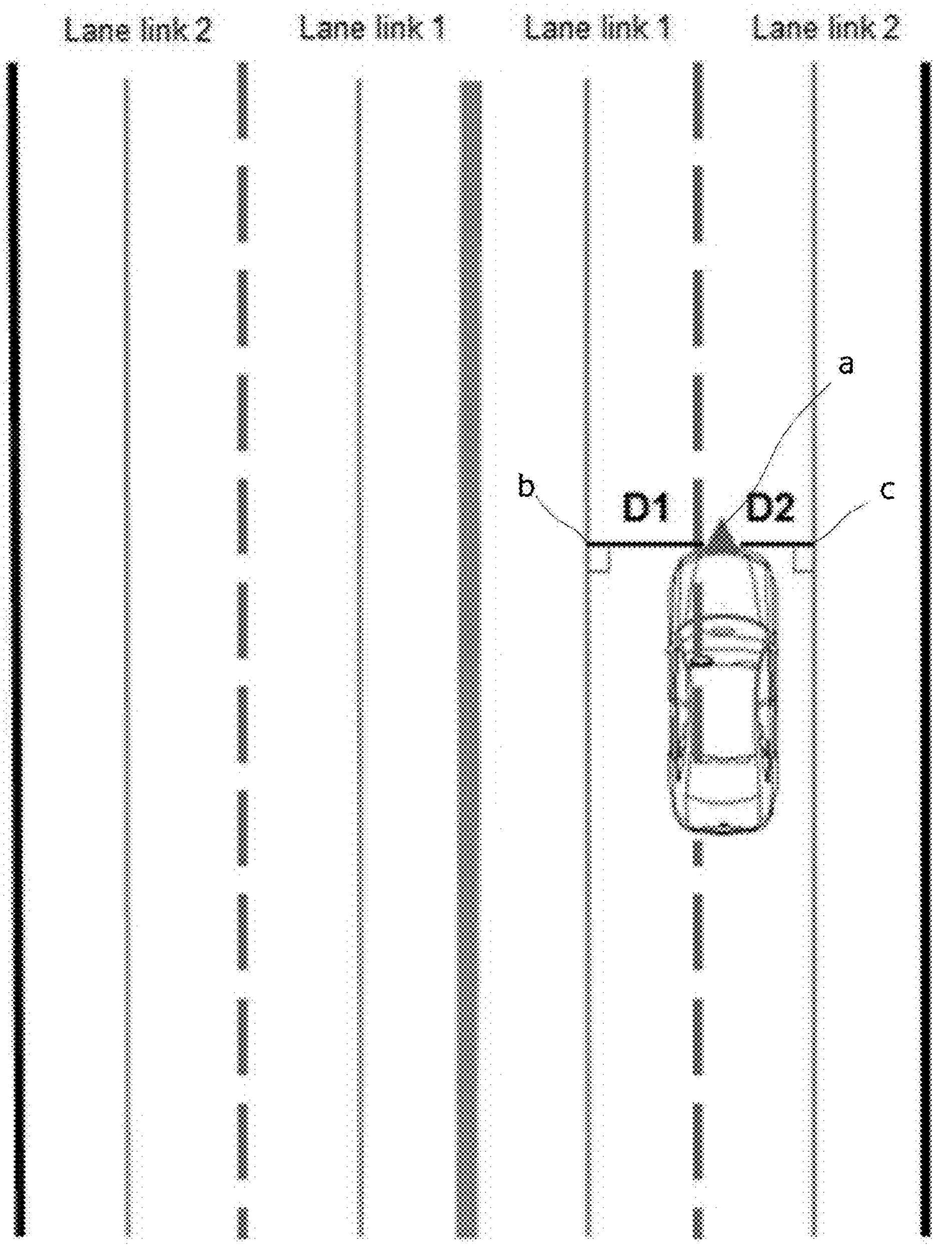
FIG. 2 is an exemplary view illustrating a method for determining a driving lane according to an embodiment of the present disclosure.

FIG. 1 is a block diagram showing an apparatus for lane-keeping control for a vehicle according to an embodiment of the present disclosure. FIG. 2 is an exemplary view illustrating a method for determining a driving lane according to an embodiment of the present disclosure.

Referring to FIG. 1, according to an embodiment of the present disclosure, an apparatus for lane-keeping control 100 for a vehicle includes a GPS receiver 110, a communication module 120, a memory 130, a capture module 140, an output module 150, and a processor 160.

The GPS receiver 110 receives GPS information from a GPS satellite (not illustrated) and provides the same to the processor 160, so that a current position may be calculated. Here, the GPS information is GPS raw measurement data. By analyzing the GPS raw measurement data, the number of satellites used for GPS positioning and pseudorange information may be obtained. The GPS information includes the time at which the GPS raw measurement data has been obtained.

The communication module 120 receives RTK information from a real-time kinematic positioning (RTK) system (not illustrated) and provides the same to the processor 160, so that a current position may be corrected.

The communication module 120 is configured to communicate with the RTK system (not illustrated) through a communication network, and may transmit and receive various information, such as RTK information. In this case, the communication module 120 may be implemented in various forms, such as a short-range communication module, a wireless communication module, a mobile communication module, and a wired communication module.

The memory 130 is configured to store data related to an operation of the apparatus for lane-keeping control 100. In particular, the memory 130 may store an application (program, applet or the like) that enables the determination of a driving lane of a vehicle 10 based on image information or the determination of a driving lane of the vehicle 10 based on precise positioning location information and map information of the vehicle 10. The information stored may be specifically selected by the processor 160 as required. In other words, the memory 130 stores various types of data that are generated in the process of executing an operating system or application (program or applet) for driving the apparatus for lane-keeping control 100. In addition, the memory 130 may store a map information DB. The map information DB may include spatial data (e.g., Geographic Information System data, GIS data) about roads and terrain features around the roads and may also include detailed spatial data such as road link information, lane link information for each road, buildings around the roads, and street trees. The memory 130 may utilize a known storage medium, and may utilize, for example, at least one of known storage media such as ROM, PROM, EPROM, EEPROM, and RAM.

The capture module 140 may capture an image of the front of the vehicle 10 and transmit the captured front image information to the processor 160. The capture module 140 may be fixed to a predetermined location, such as a windshield, a dashboard, and a rear-view mirror of the vehicle 10, to capture an image of the front of the vehicle. The capture module 140 may include, for example, a vision sensor, an image sensor, or a device performing a similar function.

The output module 150 may output information on whether lane departure occurs under the control of the processor 160. The output module 150 may include a display module (not illustrated), an audio module (not illustrated), a buzzer, a lamp, and the like. The display module serves to display lane departure information and the like through the processor 160. The display module may be implemented as, for example, a thin film transistor-liquid crystal display (TFT-LCD) panel, a light emitting diode (LED) panel, an organic LED (OLED) panel, an active matrix OLED (AMOLED) panel, or a flexible panel. The audio module may output a lane departure warning sound and the like under the control of the processor 160. The audio module may include, for example, a speaker and the like.

The processor 160 may be operatively coupled to the GPS receiver 110, the communication module 120, the memory 130, the capture module 140, and the output module 150. The processor 160 may be implemented in at least one of the followings: a central processing unit (CPU), an application-specific integrated circuit (ASIC), a digital signal processor (DSP), programmable logic devices (PLDs), field programmable gate arrays (FPGAS), a micro controller unit (MCU), and a system on chip (SoC). The processor 160 may run an operating system or an application to control a plurality of hardware or software components associated with the processor 160. The processor 160 may perform various data processing and computations. The processor 160 may be configured to execute at least one instruction stored in the memory and store the resulting data in the memory.

The processor 160 may receive line information based on the front image captured through the capture module 140, determine a driving lane of the vehicle 10 based on the received line information, and monitor for lane departure of the vehicle 10 based on the driving lane. In this case, the processor 160 may detect the lines from the front image information by using various line detection algorithms. For example, the processor 160 may convert the front image to grayscale and detect the lines through lane filtering on the converted grayscale image. Typically, by retaining only specific outlier values in the grayscale, the lines may be detected because the lines are the closest to the white color in the road image.

If a situation occurs in which the vehicle 10 departs from the driving lane, the processor 160 may notify the driving lane departure information through the output module 150 and activate a lane-keeping function by correcting the steering of a steering wheel of the vehicle. In other words, when a driving lane departure situation occurs, the processor 160 may issue a steering instruction and adjust the driving direction to ensure that the vehicle 10 may drive without crossing the lines of the driving lane. In this case, the processor 160 may control the driving of the vehicle 10 based on a central position of the identified lane.

In addition, if an adverse weather situation, such as rain or snow, occurs during driving, there may be a situation where the lines are not visible in the front image information.

In the event of the adverse weather situation (e.g., rain or snow), the processor 160 may determine (identify) a driving lane (or driving lane number) of the vehicle 10 by using precise positioning location information and map information, and the processor 160 may monitor lane departure of the vehicle 10 based on the determined driving lane.

An operation of the processor 160, in which it monitors lane departure of the vehicle 10 when the lines are not visible in the image, is described in detail below.

The processor 160 may use the GPS information received from the GPS receiver 110 and the RTK information received through the communication module 120 to correct a location of the vehicle 10, thereby calculating precise positioning location information. In other words, the processor 160 may calculate a current position of the vehicle 10 based on the GPS information received from the GPS receiver 110 and apply the RTK information received through the communication module 120 to the current position of the vehicle 10, thereby calculating precise positioning location information. The processor 160 may use GPS raw measurement information received through the GPS receiver 110 and the Radio Technical Committee for Maritime Service (RTCM) correction information received from the RTK system (not illustrated) to correct an GPS location error and obtain centimeter-level precise positioning location information.

Once the precise positioning location information is calculated, the processor 160 may obtain map information corresponding to the precise positioning location information from the map information DB. In this case, the processor 160 may obtain lane link information of a road link corresponding to the precise positioning location information from the map information DB. The lane link information may include a central location (coordinates) of the lane.

Then, the processor 160 may determine whether precise positioning location information is present within the lane based on the obtained map information. In other words, as a width of the lane is preset, the processor 160 may calculate lines marked on both sides of the lane based on the central location (coordinates) of the lane included in the lane link information. Here, the lines marked on both sides of the lane may include location (coordinates) information of the lines marked on both sides. Once the lines marked on both sides of the lane are calculated, the processor 160 may determine whether precise positioning location information is present within the range of the lines marked on both sides.

If precise positioning location information is present within the range of the lines marked on both sides of the lane, the processor 160 determines that precise positioning location information is present within the lane, thereby determining (identifying) a driving lane (or driving lane number). In this case, the processor 160 may identify the driving lane number based on the road link information obtained from the map information DB.

In addition, the vehicle 10 may move from its current driving lane to another lane and drive. In this case, the vehicle 10 is positioned across two lanes, and the processor 160 needs to identify the actual driving lane.

As such, if the precise positioning location information is present in two lanes, the processor 160 may calculate orthogonal distances between the precise positioning location information and each of the two lanes, and determine (identify) a driving lane (driving lane number) of the vehicle 10 based on the two orthogonal distances.

In addition, for precise positioning performance, quality flag information (RTK status flag) of the GGA message in the NMEA protocol may be used to determine whether the RTK status flag is in Fix status or Float status. A quality flag of 4 indicates Fix status with centimeter-level accuracy of 1 meter or less, and a quality flag of 5 indicates Float status with accuracy of 1-3 meters. If the vehicle 10 drives under a bridge, or if there is an obstacle such as an overpass, the status may temporarily change from Fix status to Float status, and the location error increases to a meter level. If a precision positioning error increases to 1-3 meters at the time of changing from Fix status to Float status, the possibility of misdetecting the driving lane number becomes greater.

Thus, the processor 160 may determine the RTK status flag from the RTK information, and may identify the driving lane (driving lane number) differently depending on whether the RTK status flag is in Fix status or in Float status. Here, the RTK status flag refers to the quality flag of the GGA message in the NMEA protocol, which may include Fix, Float, and other statuses.

If the RTK status flag is in Fix status, the processor 160 may identify a lane corresponding to the smaller value between the two orthogonal distances as the driving lane of the vehicle 10.

If the RTK status flag is in Float status, the processor 160 may apply a weight to the orthogonal distance, from the two orthogonal distances, that is associated with the lane other than the previous driving lane, and identify a lane, corresponding to the smaller value between the weighted orthogonal distance and the unweighted orthogonal distance, as the driving lane of the vehicle 10. Here, the weight may be a preset value.

A method for identifying a driving lane, for example, when the vehicle 10 drives as shown in FIG. 2, is described below. In FIG. 2, the marker '▲' may refer to precise positioning location information 'a' of the vehicle 10.

The processor 160 may calculate a first orthogonal distance D1 between a central location (coordinates, b) of a first lane (LL1, Lane link 1) and the precise positioning location information 'a' of the vehicle 10, and may calculate a second orthogonal distance D2 between a central location (coordinates, c) of a second lane (LL2, Lane link 2) and the precise positioning location information 'a' of the vehicle 10. Then, the processor 160 may compare the first orthogonal distance D1 and the second orthogonal distance D2 and identify a lane corresponding to the minimum value (min) as the driving lane (driving lane number) of the vehicle 10. In this case, since a quality flag of 4 is in Fix status with centimeter-level accuracy, the processor 160 may identify a lane corresponding to the smaller value between the first orthogonal distance D1 and the second orthogonal distance D2 as the driving lane (driving lane number) of the vehicle 10. For a quality flag of 5 in Float status, the processor 160 may compensate for the location error in Float status by applying a weight not to the first orthogonal distance D1 associated with the first lane (Lane link 1), which is the previous driving lane, but to the second orthogonal distance D2 associated with the second lane (Lane link 2).

A method for identifying a driving lane, when, for example, a lane width is 3.5 meters, the first orthogonal distance D1 is 2 meters, and the second orthogonal distance D2 is 1.5 meters, is described below. If the quality flag is in Fix status, since the minimum value (min) is the second orthogonal distance D2, the processor 160 may identify the second lane (Lane link 2) as the driving lane. If the quality flag is in Float status, since the precise positioning error becomes larger and less reliable, the processor 160 may multiply the second orthogonal distance D2, associated with the other lane other than the previous driving lane, by a weight of 1.5. Then, since the first orthogonal distance D1 is 2 meters and the second orthogonal distance D2 is 2.25 meters, the minimum value (min) is the first orthogonal distance D1. Thus, the processor 160 may identify the first lane (Lane link 1) as the driving lane.

When the driving lane of the vehicle 10 is determined, the processor 160 may perform map matching to display the vehicle 10 in the driving lane displayed by the output module 150 on a map screen (e.g., a navigation screen).

When the driving lane of the vehicle 10 is determined, the processor 160 may monitor for lane departure of the vehicle 10 based on the driving lane (driving lane number). When lane departure occurs, the processor 160 may control the steering wheel to enable the vehicle 10 to drive without departing from the driving lane. In this case, the processor 160 may output, through the output module 150, a warning sound indicating the lane departure.

As described above, when the lines are not visible due to adverse weather conditions, or the like, the processor 160 may monitor for lane departure of the vehicle 10 based on the driving lane (driving lane number), thereby enabling the continuous prevention of lane departure.

Figure 3:
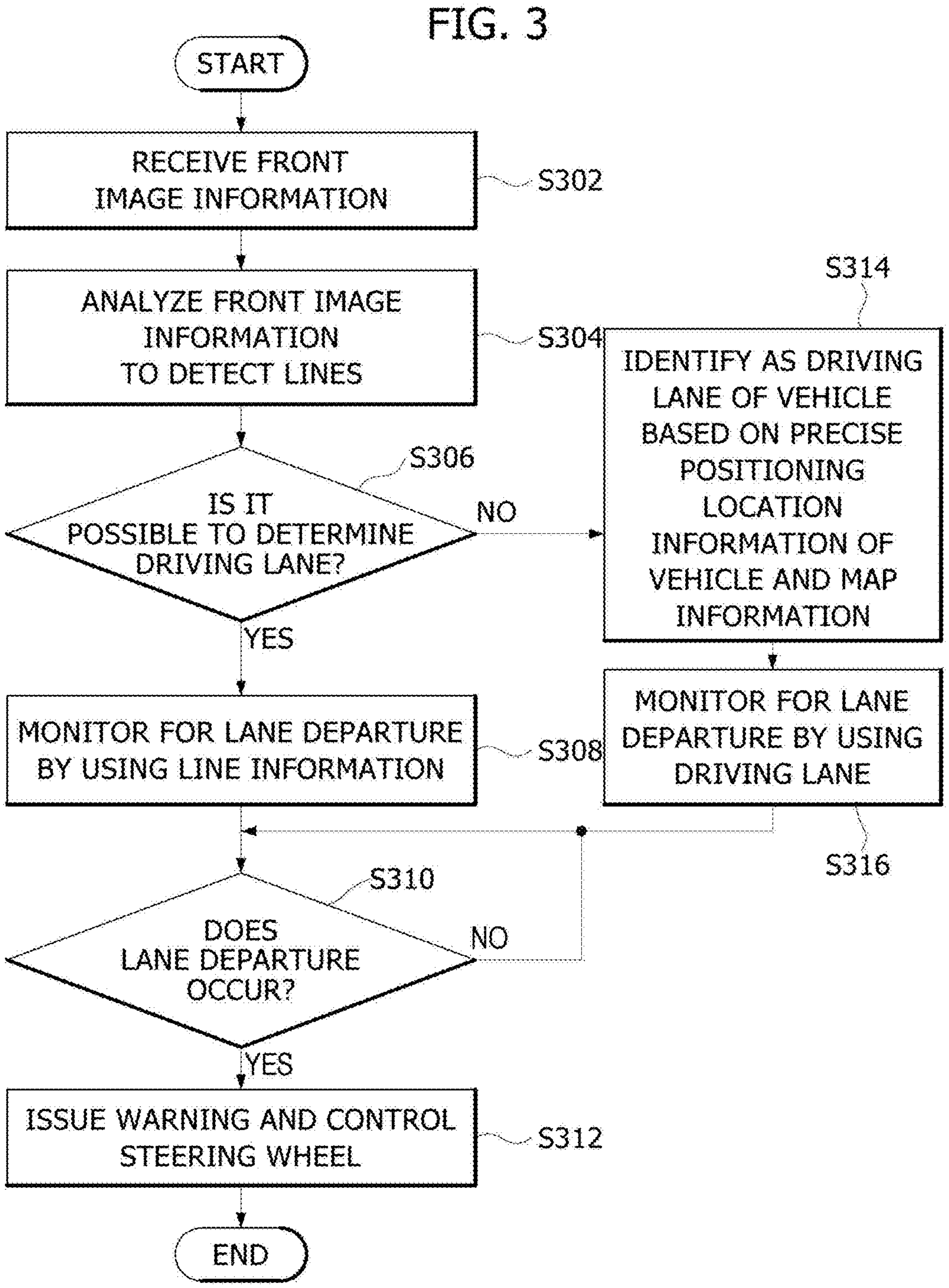
FIG. 3 is a flowchart illustrating a method for lane-keeping control for a vehicle according to an embodiment of the present disclosure.

FIG. 3 is a flowchart illustrating a method for lane-keeping control for a vehicle according to an embodiment of the present disclosure.

Referring to FIG. 3, when front image information is received (in a step S302), the processor 160 analyzes the front image information to detect lines (in a step S304). In this case, the processor 160 may detect the lines from the front image information by using various line detection algorithms.

When the step S304 is performed, the processor 160 determines whether the driving lane of the vehicle 10 may be determined by using the detected lines (in a step S306). In this case, if the lines are clearly detected, the processor 160 may determine that it is possible to determine the driving lane of the vehicle 10.

If the determination in the step S306 indicates that it is possible to determine the driving lane of the vehicle 10, the processor 160 monitors lane departure of the vehicle 10 by using the line information detected in the front image information (in a step S308), and determines whether lane departure occurs (in a step S310).

If the determination in the step S310 indicates that lane departure occurs, the processor 160 outputs, through the output module 150, a warning indicating the lane departure and controls a steering wheel to ensure that the vehicle 10 may drive without departing from the driving lane (in a step S312). In other words, the processor 160 may output a warning sound indicating lane departure, and may issue a steering instruction and adjust the driving direction to ensure that the vehicle 10 may drive without departing from the lane.

Figure 4:
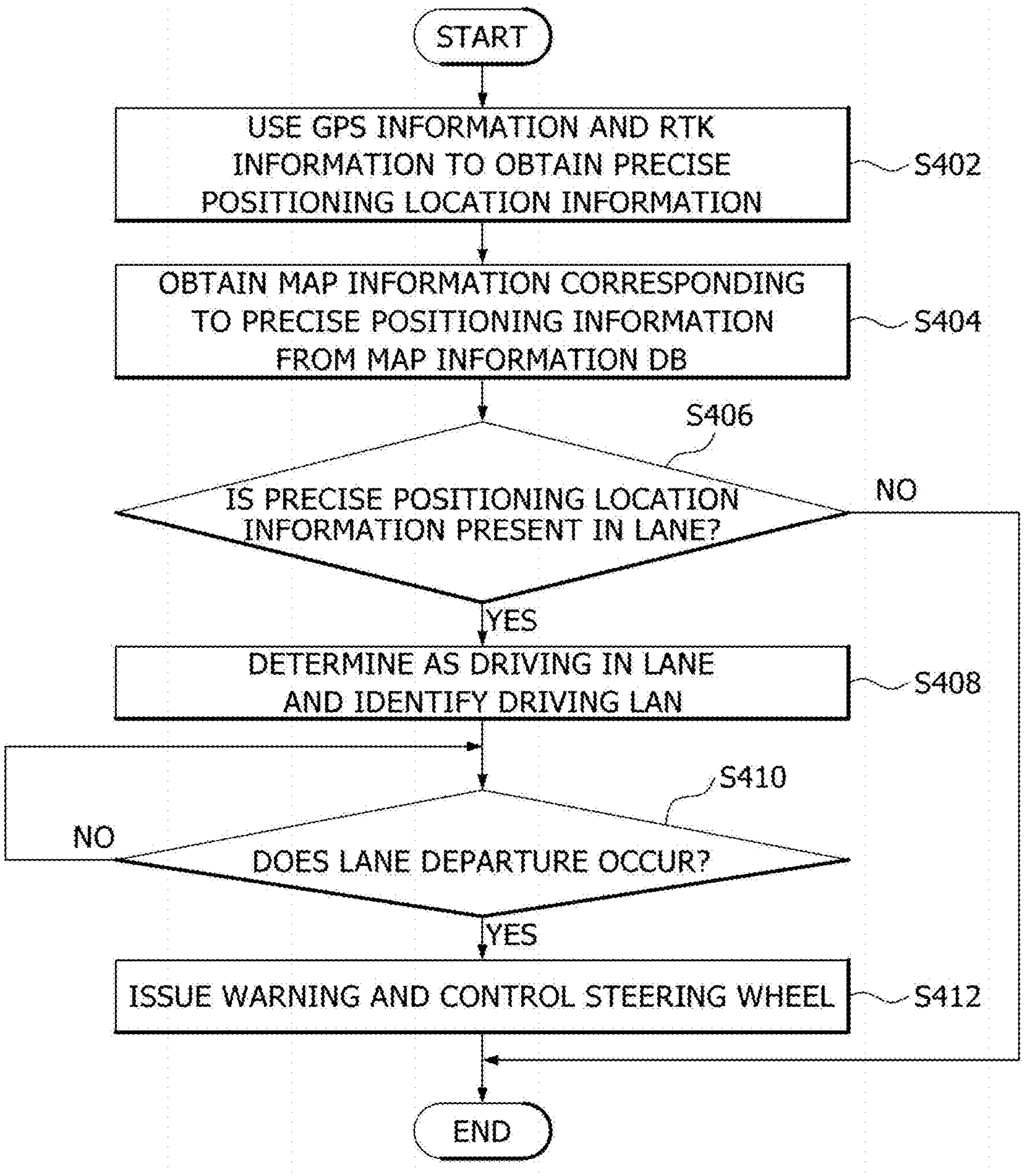
FIG. 4 is a flowchart illustrating a method for lane-keeping control for a vehicle according to another embodiment of the present disclosure.

If the determination in the step S306 indicates that it is not possible to determine the driving lane of the vehicle 10, the processor 160 identifies the driving lane (driving lane number) of the vehicle 10 based on precise positioning location information of the vehicle 10 and map information (in a step S314). Referring to FIG. 4, a detailed description of a method for identifying the driving lane number based on precise positioning location information and map information is described below.

When the step S314 is performed, the processor 160 monitors lane departure by using the identified driving lane number (in a step S316) and performs the step S310.

FIG. 4 is a flowchart illustrating a method for lane-keeping control for a vehicle according to another embodiment of the present disclosure.

Referring to FIG. 4, the processor 160 may use the GPS information received from the GPS receiver 110 and the RTK information received through the communication module 120 to correct a location of the vehicle 10, thereby obtaining precise positioning location information (in a step S402). In other words, the processor 160 may calculate a current position of the vehicle 10 based on the GPS information received from the GPS receiver 110 and apply the RTK information to the current position of the vehicle 10, thereby calculating precise positioning location information.

When the step S402 is performed, the processor 160 obtains lane link information of the road link corresponding to the precise positioning location information from the map information DB (in a step S404), and determines whether the precise positioning location information is present in the lane based on the obtained lane link information (in a step S406). In this case, the processor 160 may calculate lines marked on both sides of the lane based on the central location (coordinates) of the lane included in the lane link information. Here, the lines marked on both sides may include location (coordinates) information of the lines marked on both sides. Once the lines marked on both sides of the lane are calculated, the processor 160 may determine whether precise positioning location information is present within the range of the lines marked on both sides.

If the determination in the step S406 indicates that the precise positioning location information is present in the lane, the processor 160 determines that the vehicle 10 is driving in the lane and identifies the driving lane (in a step S408). In this case, the processor 160 may identify the driving lane number based on the road link information obtained from the map information DB.

After the step S408 is performed, the processor 160 monitors lane departure of the vehicle based on the driving lane and determines whether lane departure occurs (in a step S410).

If the determination in the step S410 indicates that lane departure occurs, the processor 160 outputs, through the output module 150, a warning indicating the lane departure and controls a steering wheel to ensure that the vehicle 10 may drive without departing from the driving lane (in a step S412). In other words, the processor 160 may output a warning sound indicating lane departure, and may issue a steering instruction and adjust the driving direction to ensure that the vehicle 10 may drive without departing from the lane.

Figure 6:
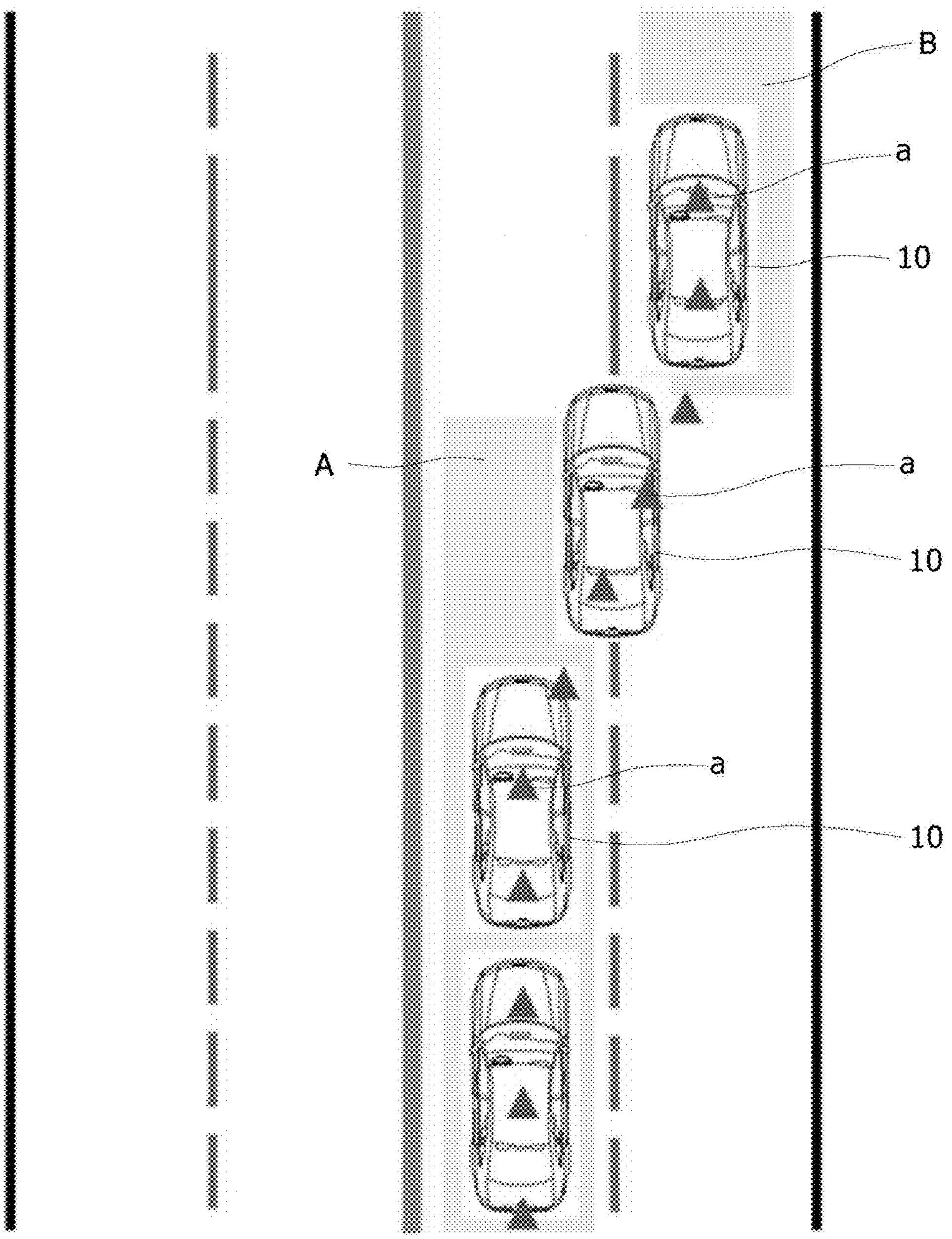
FIG. 6 is an exemplary view illustrating a method for determining a driving lane based on driving of a vehicle according to an embodiment of the present disclosure.

For example, as shown in FIG. 6, when the vehicle 10 is driving, in section A, the vehicle 10 is driving in a first lane, and the precise positioning location information 'a' is also located within a first lane link. Thus, the first lane may be determined to be the actual driving line during line map matching. Then, when the vehicle 10 departs from the first lane to the second lane, the precise positioning location information 'a' of the vehicle 10 also moves to the second lane as shown in section B. In addition, the precise positioning location information 'a' is determined to be closer to the second lane than the first lane, and thus the actual driving lane may be determined as the second lane. In this way, when the vehicle 10 departs from the first lane to the second lane, the precise positioning location information 'a' may be used to determine that the vehicle 10 is departing to the second lane during line map matching, and the warning sound and steering wheel correction may be used to activate the lane-keeping function. In FIG. 6, the marker '▲' may refer to precise positioning location information 'a' of the vehicle 10.

Figure 5:
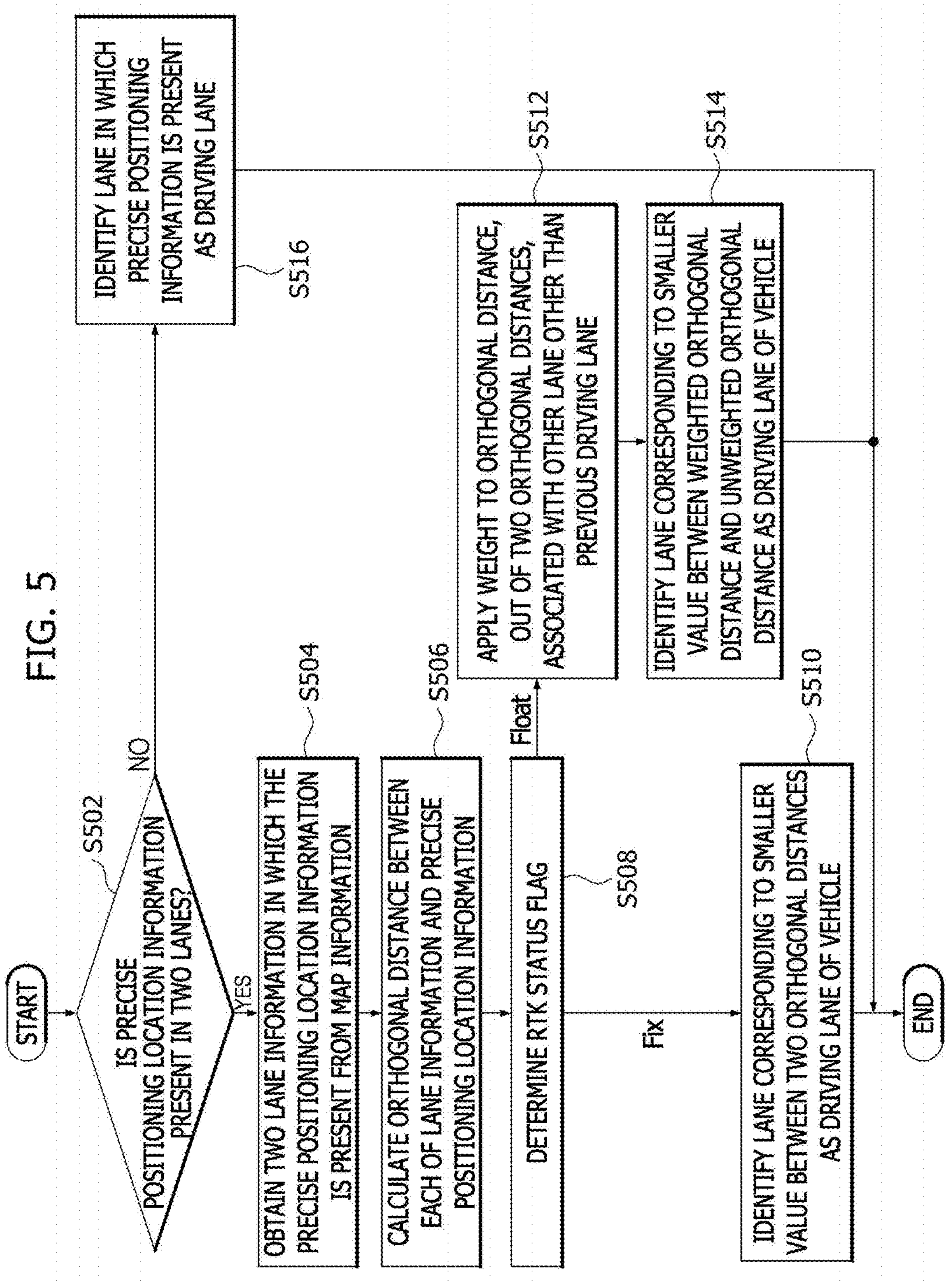
FIG. 5 is a flowchart illustrating a method for identifying a driving lane according to an embodiment of the present disclosure.

FIG. 5 is a flowchart illustrating a method for identifying a driving lane according to an embodiment of the present disclosure.

Referring to FIG. 5, the processor 160 determines whether precise positioning location information is present in two lanes (in a step S502).

If the determination in the step S502 indicates that the precise positioning location information is present in two lanes, the processor 160 obtains information on two lanes, in which the precise positioning location information is present, from the map information DB (in a step S504), and calculates an orthogonal distance between each of the obtained two lane information and the precise positioning location information (in a step S506). In this case, the processor 160 may calculate orthogonal distances between the central location of each lane and the precise positioning location information, respectively. If the determination in the step S502 indicates that the precise positioning location information is not present in two lanes, the processor 160 identifies a lane in which the precise positioning information is present as the driving lane.

After the step S506 is performed, the processor 160 determines a RTK status flag (in a step S508). In this case, the processor 160 may determine whether the RTK status flag is in Fix status or Float status.

If the RTK status flag is Fix status, the processor 160 identifies a lane corresponding to the smaller value between the two orthogonal distances as the driving lane of the vehicle 10 (in a step S510).

If the RTK status flag is in Float status, the processor 160 applies a weight to the orthogonal distance, out of the two orthogonal distances, associated with the other lane other than the previous driving lane (in a step S512), and identifies a lane corresponding to the smaller value between the weighted orthogonal distance and the unweighted orthogonal distance as the driving lane of the vehicle 10 (in a step S514).

The apparatus and the method for lane-keeping control for a vehicle according to the present disclosure may identify a driving lane by using precise positioning information and map information to identify lines even in a situation where the lines are not visible due to adverse weather conditions, thereby preventing lane departure and keeping the driving lane.

The term "module" as used herein may include a unit implemented in hardware, software, or firmware, and may be used interchangeably with terms such as, for example, logic, logic block, component, or circuit. A "module" may be an integrally configured component or a minimal unit or portion of the component that performs one or more functions. For example, according to an embodiment, a "module" may be implemented in the form of an application-specific integrated circuit (ASIC). In addition, the implementations described herein may be implemented in, for example, a method or a process, an apparatus, a software program, a data stream, or a signal. Even if only discussed in the context of a single form of implementation (e.g., discussed only as a method), the implementation of features discussed may also be implemented in other forms (e.g., an apparatus or program). A device may be implemented with appropriate hardware, software, and firmware, etc. A method may be implemented in a device, such as a processor, which generally refers to a processing device including, for example, a computer, microprocessor, integrated circuit, or programmable logic device. Processors also include communication devices such as computers, cell phones, personal digital assistants (PDAs) and other devices that facilitate communication of information between end-users.

Although the present disclosure has been described with reference to the embodiments illustrated in the drawings, the embodiments are for illustrative purposes only, and those having ordinary skill in the art should appreciate that various modifications and other equivalent embodiments are possible from the embodiments. Thus, the true technical scope of the disclosure should be defined by the following claims.

What is claimed is:

1. An apparatus for lane-keeping control for a vehicle, the apparatus comprising:
- a GPS receiver configured to receive GPS information;
- a communication module configured to receive real-time kinematic positioning (RTK) information from an RTK system; and
- a processor configured to:
  - correct a location of a vehicle by using the GPS information and the RTK information to calculate precise positioning location information;
  - obtain lane link information corresponding to the precise positioning location information; and
  - determine a driving lane of the vehicle based on the precise positioning location information and the lane link information,
- wherein, when the precise positioning location information is present in two lanes, the processor is configured to:
  - calculate orthogonal distances between the precise positioning location information and each of the two lanes; and
  - determine a driving lane of the vehicle based on the two orthogonal distances, and
- wherein the processor is further configured to:
  - determine a RTK status flag based on the RTK information, and
  - determine the driving lane of the vehicle in different manners according to the determination of the RTK status flag.

2. The apparatus of claim 1, wherein the processor is configured to:
- obtain lane link information corresponding to the precise positioning location from a map information DB;
- calculate lines marked on both sides of a lane based on a central location of the lane included in the lane link information; and
- determine the lane as the driving lane when the precise positioning location information is present within a range of the lines marked on both sides of the lane.

3. The apparatus of claim 1, wherein the processor is configured to:
- when the RTK status flag is in Fix status, determine a lane corresponding to a smaller value between the two orthogonal distances as the driving lane of the vehicle; and
- when the RTK status flag is in Float status, apply a weight to an orthogonal distance, among the two orthogonal distances, that is associated with the lane other than a previous driving lane, and determine a lane corresponding to a smaller value between the weighted orthogonal distance and an unweighted orthogonal distance as the driving lane of the vehicle.

4. The apparatus of claim 1, wherein the processor is configured to monitor lane departure of the vehicle based on the driving lane.

5. The apparatus of claim 1, further comprising a capture module configured to capture an image of a front of the vehicle,
- wherein the processor is configured to:
  - analyze the captured front image to identify line information;
  - determine the driving lane of the vehicle based on the identified line information; and
  - monitor lane departure of the vehicle based on the driving lane.

6. A method for lane-keeping control for a vehicle, the method comprising:
- analyzing, by a processor, front image information to detect lines;
- determining, by the processor, whether it is possible to determine a driving lane of the vehicle by using the detected lines;
- in response to that it is not possible to determine the driving lane, determining, by the processor, the driving lane of the vehicle based on precise positioning location information of the vehicle and map information; and monitoring lane departure, by the processor, by using the driving lane, wherein determining the driving lane of the vehicle comprises:

correcting, by the processor, a location of the vehicle using GPS information and RTK information of the vehicle to calculate the precise positioning location information;

obtaining, by the processor, lane link information corresponding to the precise positioning location information; and determining, by the processor, the driving lane of the vehicle based on the precise positioning location information and the lane link information, wherein determining the driving lane of the vehicle based on the precise positioning location information and the lane link information includes: when the precise positioning location information is present in two lanes, calculating orthogonal distances between the precise positioning location information and each of the two lanes; and determining the driving lane of the vehicle based on the two orthogonal distances, wherein determining the driving lane of the vehicle based on the precise positioning location information and the lane link information further includes: determining a RTK status flag based on the RTK information, and determining the driving lane of the vehicle in different manners according to the determination of the RTK status flag.

7. The method of claim 6, wherein obtaining lane link information includes obtaining lane link information corresponding to the precise positioning location from a map information DB.

8. The method of claim 6, wherein determining the driving lane of the vehicle based on the precise positioning location information and the lane link information includes: calculating lines marked on both sides of a lane based on a central location of the lane included in the lane link information; and determining the lane as the driving lane when the precise positioning location information is present within a range of the lines marked on both sides of the lane.

9. The method of claim 6, wherein determining the driving lane of the vehicle based on the precise positioning location information and the lane link information includes:

determining a lane corresponding to a smaller value between the two orthogonal distances as the driving lane of the vehicle when the RTK status flag is in Fix status; and when the RTK status flag is in Float status, applying a weight to the orthogonal distance, among the two orthogonal distances, that is associated with a lane other than a previous driving lane, and determining a lane corresponding to a smaller value between the weighted orthogonal distance and an unweighted orthogonal distance as the driving lane of the vehicle.

10. The method of claim 6, further comprising, after determining whether it is possible to determine the driving lane of the vehicle, monitoring lane departure of the vehicle, by the processor, by using the detected lines when it is possible to determine the driving lane.

11. A method for lane-keeping control for a vehicle, the method comprising:

correcting, by a processor, a location of a vehicle by using GPS information and RTK information of the vehicle to calculate precise positioning location information;

obtaining, by the processor, lane link information corresponding to the precise positioning location from a map information DB;

determining, by the processor, a driving lane of the vehicle based on the precise positioning location information and the lane link information; and monitoring lane departure, by the processor, by using the driving lane, wherein determining the driving lane of the vehicle includes: when the precise positioning location information is present in two lanes, calculating orthogonal distances between the precise positioning location information and each of the two lanes; and determining the driving lane of the vehicle based on the two orthogonal distances, and wherein determining the driving lane of the vehicle further includes: determining a RTK status flag based on the RTK information, and determining the driving lane of the vehicle in different manners according to the determination of the RTK status flag.

12. The method of claim 11, wherein determining the driving lane of the vehicle includes:

calculating lines marked on both sides of a lane based on a central location of the lane included in the lane link information; and determining the lane as the driving lane when the precise positioning location information is present within a range of the lines marked on both sides of the lane.

13. The method of claim 11, wherein determining the driving lane of the vehicle includes:

determining a lane corresponding to a smaller value between the two orthogonal distances as the driving lane of the vehicle when the RTK status flag is in Fix status; and when the RTK status flag is in Float status, applying a weight to an orthogonal distance, among the two orthogonal distances, that is associated with a lane other than a previous driving lane, and determining a lane corresponding to a smaller value between the weighted orthogonal distance and an unweighted orthogonal distance as the driving lane of the vehicle.

* * * * *